US012736325B2

(12) United States Patent
Ettelt et al.

(10) Patent No.: US 12,736,325 B2
(45) Date of Patent: Sep. 15, 2026

(54) COUPLING CLAMP FOR CONTACTLESS SENSOR UNIT

(71) Applicant: TESA SÀRL, Renens (CH)

(72) Inventors: Dirk Ettelt, Renens (CH); Julien Singer, Burdignin (FR); Julien Chardonnens, Bulle (CH); Davide Manetti, Pully (CH)

(73) Assignee: TESA SÀRL, Renens (CH)

( * ) Notice: Subject to any disclaimer, the term of this patent is extended or adjusted under 35 U.S.C. 154(b) by 670 days.

(21) Appl. No.: 17/555,155

(22) Filed: Dec. 17, 2021

(65) Prior Publication Data

US 2022/0196387 A1 Jun. 23, 2022

(30) Foreign Application Priority Data

Dec. 18, 2020 (EP) .................................... 20215404

(51) Int. Cl.
*G01B 11/00* (2006.01)
*G02B 6/36* (2006.01)

(52) U.S. Cl.
CPC .......... *G01B 11/005* (2013.01); *G02B 6/3624* (2013.01)

(58) Field of Classification Search
CPC .............. G01B 11/005; G01B 2210/50; G01B 11/026; G01B 11/007; G02B 6/3624; B25B 23/0035; H01R 13/00
See application file for complete search history.

(56) References Cited

U.S. PATENT DOCUMENTS 5,069,524 A * 12/1991 Watanabe ............ H01R 13/625 385/59
5,409,322 A * 4/1995 Horikawa ............. B23B 31/265 403/328

(Continued)

FOREIGN PATENT DOCUMENTS

EP 2 667 147 A1 11/2013
WO 2009/016185 A1 2/2009
WO 2009062641 A1 5/2009

OTHER PUBLICATIONS

Webb, Greg, "CNC Collets: Types and Maintenance Tips", Oct. 17, 2022, https://www.techniksusa.com/cnc-collets-types-and-maintenance-tips-techniks/#:~:text=What%20are%20Collets?,power%20around%20its%20center%20bore. (Year: 2022).*

(Continued)

*Primary Examiner* — Rebecca C Bryant
(74) *Attorney, Agent, or Firm* — Maschoff Brennan

(57) ABSTRACT

Disclosed herein is a contactless sensing unit for a measuring apparatus or machine tool 1, notably for a coordinate measuring machine (CMM). The contactless sensing unit comprises an optical probe device, a coupling element for mechanical connection to a complementary coupling element on the measuring apparatus or machine tool and a housing for housing the optical probe device. The housing is mechanically connected to the coupling element. The optical probe device comprises an optical objective at a distal end of a lower portion of the probe device for sensing a surface of a workpiece. The contactless sensing unit further comprises a collar for adjusting a relative axial, radial and/or angular position of the optical probe device with respect to a fastening portion of the housing. The collar circumferentially clamps the optical probe device essentially around an upper portion of the optical probe device.

15 Claims, 3 Drawing Sheets

(56) References Cited

U.S. PATENT DOCUMENTS

| | | | | |
|---|---|---|---|---|
| 6,482,148 | B1 | 11/2002 | Luke | |
| 9,903,701 | B2 * | 2/2018 | Gong | H04Q 9/00 |
| 10,234,272 | B2 * | 3/2019 | Jensen | G01B 11/007 |
| 11,326,865 | B2 * | 5/2022 | Tobiason | G01B 11/24 |
| 2018/0172442 | A1 | 6/2018 | Thys | |
| 2020/0056993 | A1 | 2/2020 | Mies et al. | |

OTHER PUBLICATIONS

Zagielski, Mike, "What is the difference between a chuck and a collet?" Jun. 20, 2024, https://www.foredom.net/2024/06/what-is-the-difference-between-a-chuck-and-a-collet/ (Year: 2024).*

* cited by examiner

COUPLING CLAMP FOR CONTACTLESS SENSOR UNIT

FIELD OF THE INVENTION

The present invention concerns a contactless sensor unit for measuring apparatus, notably for coordinate measuring machine (CMM), and, alternatively or complementarily, for machine tools, notably for computerized numerical control machines (CNC). The contactless sensor unit may be, in particular, part of a chromatic white light sensing (CWS) system for dimensional and/or surface properties (e.g. roughness) measurements.

DESCRIPTION OF RELATED PRIOR ART

A CWS measuring system relies on illuminating a surface to be measured by a white light generated by a light source, for example a polychromatic light source. The CWS measuring system comprises an optical probe device with an optical objective for focusing different wavelengths of this light at different distance from the optical probe device. The surface will then substantially reflect the focused wavelength while dispersing the other wavelengths. The distance between the surface and the optical probe device can then be deduced by determining the wavelength of the returned light, notably by means of a wavelength analyser, the light being advantageously returned through the same optical objective of the optical probe device. The optical probe device is advantageously configured to further filter unfocused wavelength on the surface, i.e. providing a spatial filtering of returned light, notably by means of the optical objective.

WO2009062641 and EP2667147 disclose examples of CWS measuring systems for CMM comprising a contactless sensing unit having an optical probe device configured for interfacing with a CMM.

More particularly, WO2009062641 discloses a CWS measuring system comprising a CWS contactless sensing unit that is configured to be connected to a CWS unit holder mounted on an articulated arm of a CMM machine. The CMM machine comprises a CWS controller having a light source and an analyser while the CWS contactless sensing unit contains the optical probe device adapted to be optically connected to the CWS unit holder by means of a multimode optical fibre. The contactless sensing unit is not only configured to focus light coming from the CWS controller on a given surface but also to collect and direct the light reflected by the surface into the CWS analyser through the same multimode fibre.

This CWS measuring system may provide efficient and rapid measures of substantially convex or flat external surfaces of workpieces when the CWS contactless sensing unit is mounted on a linear-CMM or on a bridge-CMM vertical arm. However, it lacks in versatility for measuring more complex surfaces.

In order to increase the measurements versatility, EP2667147 discloses a CWS measuring system comprising a CWS sensing unit which is mounted on an articulated probe head of a CMM. The CWS sensing unit, in form of an optical pen, comprises a light source, a wavelength detector and an exchangeable chromatically dispersive optics unit. Increased measurements versatility is counterbalanced by a more complex assembly of the CWS sensing unit as well as an increase of the weight and size of the CWS sensing unit which must be handled by the probe head during measurements.

The above-described CWS measuring systems are not adapted for integrating several optical probe devices having different shapes and/or sizes. Moreover, integration of the optical probe device in a CWS contactless sensing unit of a CMM machine, as disclosed in WO2009062641 and in EP2667147, may be difficult to achieve as the contactless sensing unit has to be precisely and permanently supported by the CMM in any possible position, not only independently of the orientations and of the movements of the optical probe, but also for a large catalogue of optical probe devices. An efficient integration of this optical probe device in the CWS contactless sensing unit is therefore costly.

US2018/0172442 discloses a dimensional probe unit for attachment to a probe head of a localizer. The probe unit comprises a measurement probe for dimensional measurement of an object, a revolute joint integrated into the measurement probe, and a probe unit interface for repeated dismountable connection to a probe head. The probe unit interface is rotatably connected to the measurement probe by the revolute joint.

The measurement probe housing is therefore rotatably mounted relative to the probe unit interface which has the inconvenient to provide only a coarse positioning of the measurement probe.

BRIEF DISCLOSURE OF THE INVENTION

An aim of the present invention is therefore to provide a contactless sensing unit for a measuring apparatus or machine tool that overcomes, at least partially, the shortcomings and limitations of the state of the art.

More particularly, an aim of the present invention is to provide a contactless sensing unit which can accommodate several types of optical probe devices having different sizes and shapes and which allow a fine positioning of the contactless sensing unit.

Another aim of the present invention is to provide a contactless sensing unit which can precisely and permanently hold the optical probe device, in a robust manner, in a given position independently of the orientations and of the movements of the contactless sensing unit.

According to the invention, these aims are achieved by a contactless sensing unit for a measuring apparatus or machine tool (e.g. a CMM, a CNC), wherein the contactless sensing unit comprises an optical probe device, a coupling element for mechanical connection to a complementary coupling element of the measuring apparatus or machine tool, and a housing for housing the optical probe device. The housing is mechanically connected to the coupling element. The optical probe device comprises an optical objective at a distal end of a first portion of the optical probe device for sensing a surface of a workpiece. The contactless sensing unit further comprises a collar for adjusting a relative axial, radial and/or angular position of the optical probe device with respect to a fastening portion of the housing (i.e., an adjustment of a relative axial position and/or a relative radial position and/or a relative angular position of the optical probe device with respect to the fastening portion). The pre-alignment notably provides an adjustment (e.g. fine tuning, uncertainty reduction) of one or more optical operational parameters of the optical probe device. The collar circumferentially clamps the optical probe device essentially around a second distinct portion of the optical probe device. The first portion is positioned nearer the surface of the workpiece to be measured than the second portion. The coupling element can further provide an optical connection to the complementary coupling element. The optical probe device can be optically connected to the coupling element of the contactless sensing unit notably by an optical fibre, alternatively or complementarily, by means of one or more lens and/or mirrors.

For the sake of clarity, the first portion is thereafter referred as lower portion, while the second portion is thereafter referred as upper portion. By the term "upper" it is meant directed towards the light source on which the measurement relies (along the optical path of the optical probe device), while by "lower" it is meant directed to the object to be measured (along the optical path of the optical probe device) for measurements. The optical path corresponds notably to the path the light travels up to and/or from the optical objective in the optical probe device. By the term "axial position" it is meant the position of the optical probe device along its longitudinal axis. By the term "radial position" it is meant the position of the optical probe device perpendicular to its longitudinal axis.

In an embodiment, the collar is rigidly united with the coupling element of the contactless sensing unit for maintaining the optical probe device in a stable axial position and/or an angular position with respect to the coupling element for precise measurements.

The housing of the contactless sensing unit may comprise a first housing portion for housing the optical fibre (alternatively or complementarily, the one or more lens and/or mirrors optically connecting the optical probe device to the coupling element) and/or for (rigidly) connecting the coupling element, and preferably a second housing portion essentially housing the optical probe device.

The contactless sensing unit (notably the housing, e.g. the first and/or the second housing portion, and/or the coupling element) comprises the fastening portion for mechanically connecting (e.g. rigidly fixing and/or receiving) the collar. The fastening portion can notably take the form of an annular flat seat portion, against which the collar is fixed.

In an embodiment, the coupling element of the contactless sensing unit is rigidly connected, directly or by means of an additional interface, to the housing, notably to the first housing portion, for providing a stable positioning of the optical probe device with respect to the coupling element.

In an advantageous embodiment, the collar has a thermal expansion coefficient equal (or at least similar) to the thermal expansion coefficient of the optical probe device (notably of his body). Preferably, the collar is made by the same material(s) of the (body of the) optical probe device, being typically steel.

In an advantageous embodiment, the collar is provided with a clamping force regulator (e.g. in form of an elastic collar with a force-regulating screw) for regulating and/or adjusting the clamping force against the optical probe device. The use of a clamping force regulator provides, not only an adjustment of the axial, radial and angular position of the optical probe device, but also a fine tuning and/or regulation of the clamping force applied to the optical probe device by the collar for guarantying not only elimination of vibrations and/or the temperature-induced slipping effect but also the physical integrity of the optical probe device.

In an embodiment, the optical probe device has an essentially cylindrical body and the collar is an adjustable ring clamping the upper portion of the cylindrical body. The adjustable ring may comprise a force regulating screw which advantageously prevents stick-slip effects of the optical probe device which may be induced by vibration and/or temperature variation. Advantageously, the collar is made of a material or materials (e.g. alloy) having a thermal expansion equal (or at least similar) to the thermal expansion of the cylindrical body. Preferably, the collar is made by the same material(s) of the cylindrical body.

A contactless sensing unit comprising a collar for circumferentially clamping an optical probe device essentially around its upper portion has the advantage to not depend on a particular type of probe device (notably shapes and dimensions thereof) and can therefore be used with a wide range of optical probe devices. Moreover, the collar provides an accurate axial, radial and angular positions of the clamped optical probe device within the contactless sensing unit with an axial and radial resolution below 1 mm and an angular resolution below 1°.

In an advantageous embodiment, the contactless sensing unit comprises a data storage circuit for storing an operational parameter related to an axial and/or a radial and/or an angular position of the optical probe device (notably of the optical objective thereof). The axial and/or radial and/or angular position of the optical probe device is achieved (e.g. adjusted) and/or feasible by means of the collar.

The operational parameter can be or represent:

- an axial and/or radial and/or angular position of the optical probe device notably related to a virtual or physical reference,
- an axial and/or radial and/or angular adjustment of the optical probe device notably related to a reference position,
- a deviation of a axial and/or radial and/or angular position of the optical probe device from an axial and/or radial and/or angular reference position, and/or
- an axial and/or radial and/or angular position of the contactless sensor unit to be provided to the measuring apparatus or machine tool for measurement, notably related to the workpiece to be measured.

The operational parameters can be stored during the assembly of the contactless sensing unit in the factory. Alternatively or complementarily, the operational parameters can be stored during calibration processes. The contactless sensing unit can be configured to provide (to the measuring apparatus or machine tool) a wireless, wired and/or optically access to the data storage circuit.

In one particular embodiment, the coupling element is configured to power and/or transmit data to the data storage circuit.

In an embodiment, the second housing portion comprises an opening surrounding the optical objective of the optical probe device. The second housing portion can also comprise a ring configured to be in contact with a surface of the optical objective and/or of the optical probe device (notably with a annular chamfer 16 thereof) for reducing vibration and/or for shock absorption and/or for avoiding intrusion of water and/or dust in an internal volume of the contactless sensing unit.

The optical probe device can be notably configured to manage emitted light and/or sensed light by means of the optical objective. In particular, the optical probe device can be configured to focus and/or emit light through the optical connection provided by the coupling element (e.g. fibre) and/or to collect light reflected by the surface of the workpiece within the optical connection provided by the coupling element (e.g. optical fibre, lens, mirrors).

The optical probe device can be part of: a chromatic distance sensing system (e.g. a chromatic white light sensing system), an interferometric distance sensing system, an optical roughness sensing system, an optical profilometer, and/or on an inspection camera system.

In an embodiment, the optical probe device comprises one or a combination of the following element: a chromatic dispersive optical unit, a chromatic distance sensor, an interferometric distance sensor, an optical roughness sensor, an optical profilometer, an inspection optical unit and an inspection camera.

In a particular advantageous embodiment, the optical probe device is part of a chromatic distance sensing system, while the optical objective is configured to focus different wavelengths of the (provided) light at different distance from the optical probe device and, preferably, for filtering unfocused wavelengths on the surface from returning light (i.e. spatial filtering of returned light). The optical objective can thus take a form of: a chromatic dispersive lens, a dispersive optic, a dispersive lens system or a dispersive lens assembly.

Another aspect of the invention relates to a measuring apparatus or machine tool, notably a coordinate measuring machine, comprising the contactless sensor unit as described above. The measuring apparatus or machine tool comprises a complementary coupling element connected to the coupling element of the contactless sensor unit. The complementary coupling element can be part of an articulated probe head for orienting and/or positioning the contactless sensor unit. Preferably, the contactless sensor unit is configured to measure a dimension or surface properties in a static configuration, in which the articulated probe head is at a standstill, or in a dynamic configuration, in which the articulated probe head continuously moves while the contactless sensing unit measures a dimension or surface properties. A static orientation and/or positioning can be (alternatively or complementarily) provided manually by an operator. The articulated probe head can be configured to provide an indexable and/or a continuous orientation and/or positioning of the contactless sensor unit. Advantageously, the articulated probe head can be configured to provide an orientation of the contactless sensor unit around 2 or 3 rotational axes. Advantageously, the measuring apparatus or machine tool can be provided with a rotary table on which a workpiece to be measured can be positioned. The rotary table can support, alone or in cooperation with the articulated head, the measuring apparatus or machine tool notably in scanning a workpiece, either in a closed loop configuration (e.g. in case of an unknown workpiece, no model is provided to the measuring apparatus or machine tool) or in an open loop configuration (e.g. in case the measuring apparatus or machine tool has a description of the workpiece, e.g. by means of a CAD or 3D model).

Measurement versatility is thus increased by allowing measurement of non-flat workpieces along a plurality of orientations without requiring a manual repositioning of the workpiece.

Moreover, the accurate axial and/or radial positioning and/or angular positioning of the optical probe device provided by the collar permits to optimise measurements as well as calibration processes by reducing the optical operational uncertainty (i.e. tolerance range, notably related to the operational range and axis, alignment and/or operational volume) caused by the manufacturing and/or assembly of the optical probe device in the contactless sensing unit. Moreover, the data storage circuit enables automatically or semi-automatically measurements and/or calibration processes.

Another aspect of the invention relates to a method for measuring a dimension or surface properties (e.g. roughness) of a workpiece by means of a contactless sensing unit. The contactless sensing unit comprises: an optical probe device having an optical objective for sensing a workpiece, a coupling element for mechanical connection to a complementary coupling element of a measuring apparatus or machine tool, and a housing mechanically connected to the coupling element and configured to house the optical probe. The method comprises a pre-alignment of the optical probe device with respect to the contactless sensing unit (e.g. with respect to fastening portion thereof), i.e. an adjustment of a relative axial and/or radial position and/or a relative angular position of the optical probe device with respect to the fastening portion of the contactless sensing unit by means of the collar so as to provide a given axial, radial and/or angular position of the optical probe device. The method also comprises: determining an operational parameter related to (dependent of) said given axial and/or radial and/or angular position of the optical probe device; and storing the operational parameter in a data storage circuit of the contactless sensing unit.

The adjustment of the optical probe device inside the contactless sensing unit may be achieved by clamping the collar around a surface of the optical probe device and/or fixing the collar to the fastening portion of the contactless sensing unit.

The method can also comprises steps of: attaching the contactless sensing unit to a measuring apparatus or machine tool by means of a complementary coupling element thereof; reading (advantageously automatically reading) in the measuring apparatus or machine tool the parameters related to the axial, radial and/or angular positions of the optical probe device which are stored in the data storage circuit of the contactless sensing unit; and providing the measurement of the dimension or surface properties of the workpiece relying on the read parameters.

BRIEF DESCRIPTION OF THE DRAWINGS

Exemplar embodiments of the invention are disclosed in the description and illustrated by the drawings in which.

DETAILED DESCRIPTION OF SEVERAL EMBODIMENTS OF THE INVENTION

Figure 1:
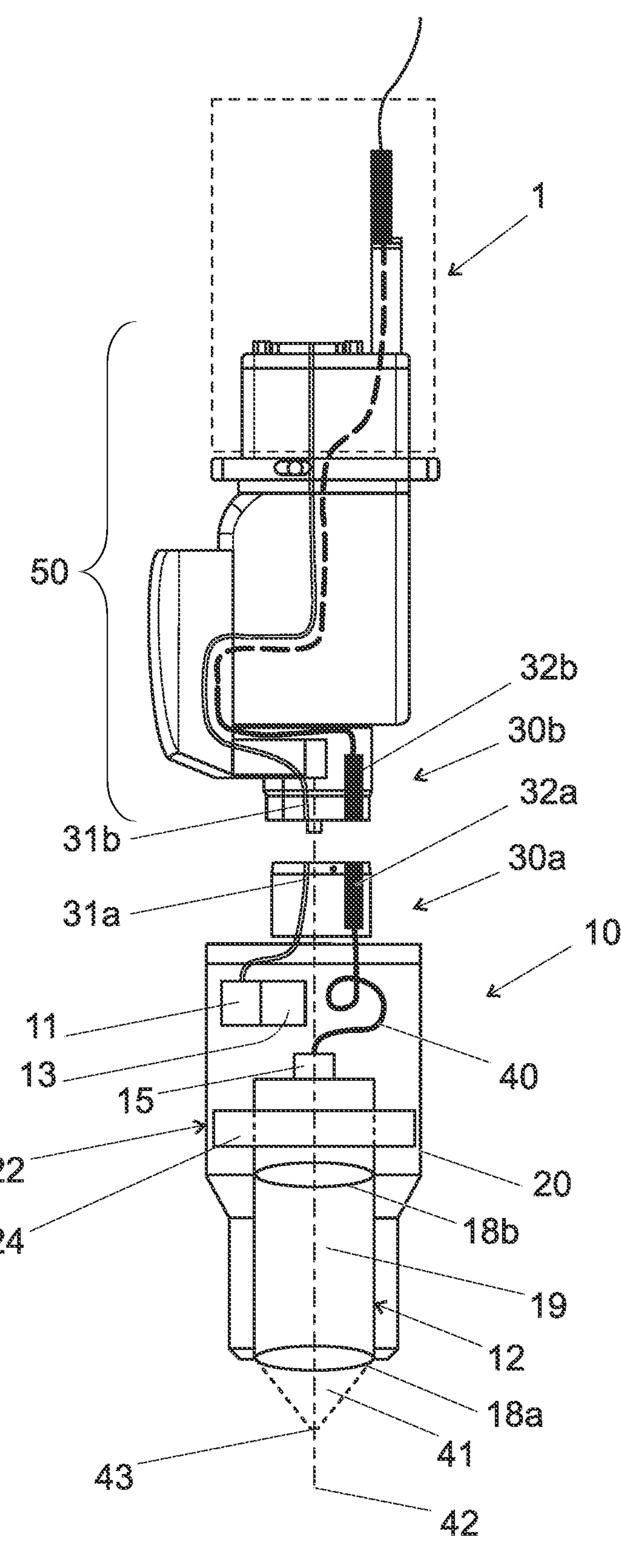
FIG. 1 illustrates schematically a contactless sensor unit mounted in an articulated probe head of a CMM according to an embodiment.

The invention relates to a contactless sensing unit 10 for a measuring apparatus or machine tool 1 as illustrated in FIG. 1. The contactless sensing unit 10 comprises an optical probe device 12 and a coupling element 30*a* for mechanical connection to a complementary coupling element 30*b* on the measuring apparatus or machine tool 1, possibly on an articulated probe head 50 thereof.

The optical probe device 12 comprises one or more optical objectives, for example a first and second objectives 18*a*, 18*b* for contactless sensing a surface of a workpiece for providing a dimensional or surface properties measurement. The optical probe device 12 can be configured to allow a manual or automatic replacement of the one or more optical objectives 18*a*, 18*b*.

Figure 3:
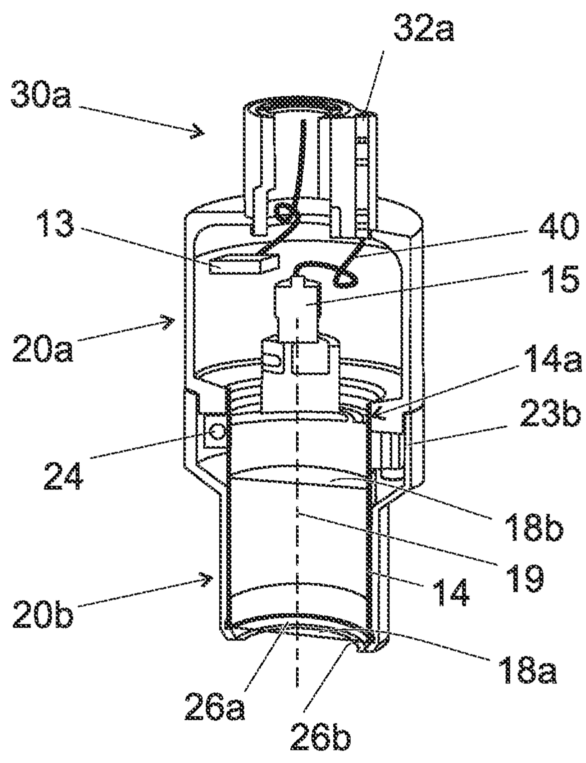
FIG. 3 illustrates an axial cross-sectional view of FIG. 2.
Figure 4:
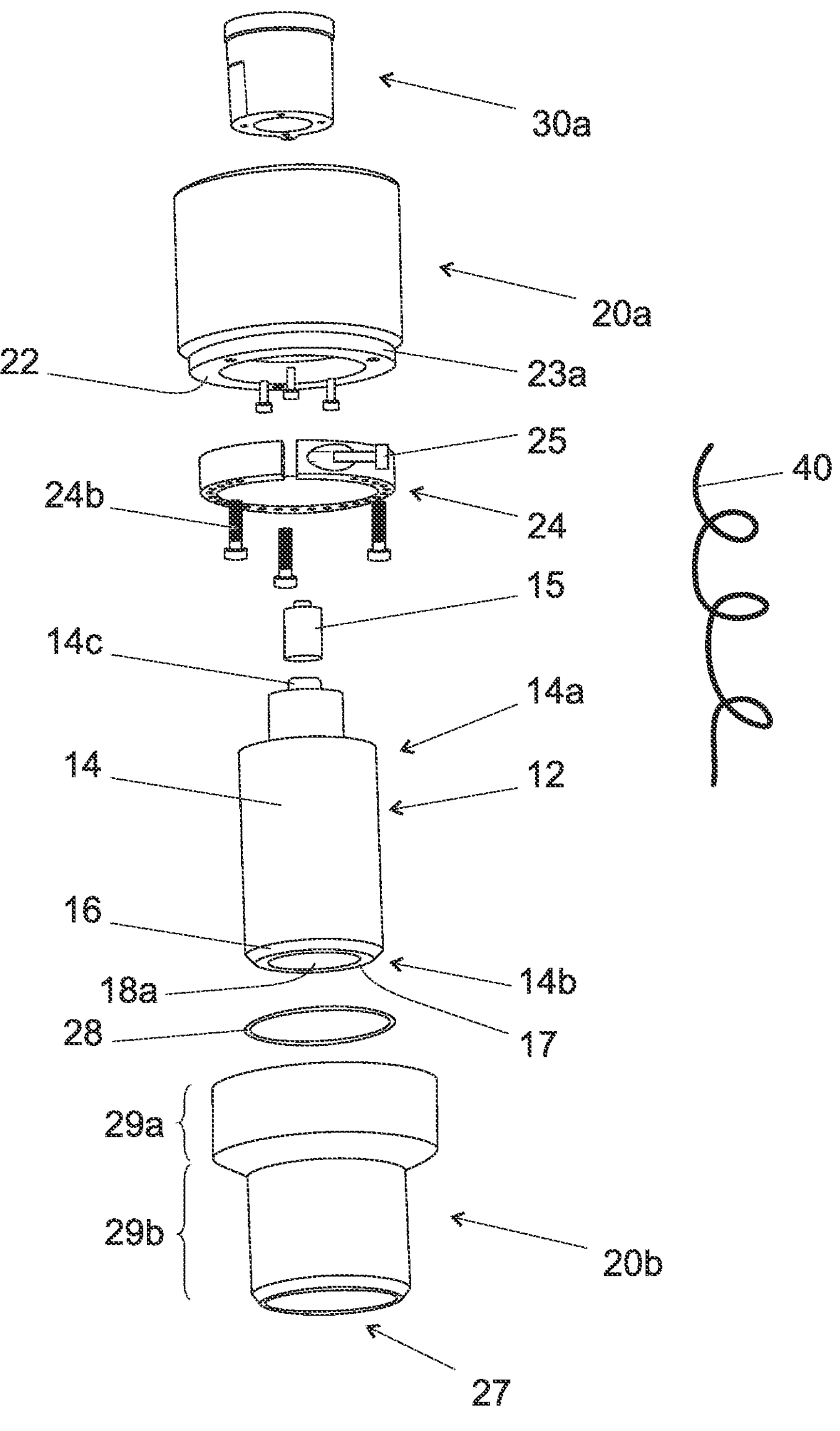
FIG. 4 illustrates an exploded view of FIG. 2.

In particular, the optical probe device 12 can be (mechanically) configured, by means of one or more optical objectives 18*a*, 18*b*, to emit light (in a predefined manner) against a surface of the workpiece for dimensional or surface properties measurement. The optical probe device 12 can collect light from a light source, notably by means of a connector receiving portion 14*c* as shown in FIGS. 3 and 4. The connector receiving portion 14*c* can be an air-gap receiving connector, or can be arranged to cooperate with a fibre connector 15.

Alternatively or complementarily, the optical probe device 12 can be (mechanically) configured, by means of one or more optical objectives 18*a*, 18*b*, to collect light reflected by the surface of the workpiece (in a predefined manner) for dimensional or surface properties measurement. The optical probe device can return the collected light by means of a portion 14*c* that can correspond to the receiving portion 14*c* used for collecting light as illustrated in FIG. 1.

According to the invention, light can be any electromagnetically radiation that can be perceived by human eye (visible light) and/or having wavelengths in the Ultraviolet (UV) and/or infrared (IR) spectrum.

The optical probe device 12 can thus take a form of an objective(s) assembly or unit, wherein one optical objective 18*a* is positioned at a distal end of the optical probe device 12.

By the term "distal end" it is meant the end portion of the device that is directed towards the object to be measured.

The optical probe device 12 can be part of: a chromatic distance sensing system, for example a chromatic white light sensing system, an interferometric distance sensing system, an optical roughness sensing system, an optical profilometer, and/or an inspection camera system. In particular, the optical probe device 12 can take the form of: a chromatic dispersive optical unit, a chromatic distance sensor, an interferometric distance sensor, an optical roughness sensor, an optical profilometer, an inspection optical unit and an inspection camera.

The optical probe device 12 can be part of a measurement system providing: a point-to-point (punctual) measurement of a dimension or of a surface properties of a workpiece, and/or a scanning (i.e. series of punctual measurements obtained by continuous sensing) of dimensions or surface properties of a workpiece. The scanning can be executed in an open or closed loop, i.e. with or without a-priori knowledge of the geometry of the workpiece, notably provided by means of a CAD file. In a closed loop configuration, the optical probe device 12 is (also) used to monitor the position of the workpiece in real time.

In the exemplary embodiment of FIG. 1, the optical probe device 12 is a chromatic confocal sensor of a CWS measuring system. According to the invention, a chromatic confocal sensor can be any unit configured to focus different wavelengths of light at different distances from the optical objective and to collect reflected wavelengths (returning light), such as, for example, a chromatic dispersive lens unit, a dispersive optic unit, a dispersive lens system or a dispersive lens assembly. The CWS measuring system also comprises a light source and a light analyser (not shown) (e.g. a wavelength analyser) for operating the chromatic confocal sensor. The light source and the light analyser can be mounted on a static portion of the measuring apparatus or machine tool 1. The static portion is static with respect to the measuring volume of the measuring apparatus or machine tool (i.e. the volume within which a workpiece can be located or machined for measuring). Alternatively, the light source and the light analyser can be mounted on a mobile portion of the measuring apparatus or machine tool 1, such as in a mobile (e.g. vertical or horizontal) axis thereof, or even in the articulated probe head 50.

Nevertheless, the optical probe device 12 may be any other type of contactless sensors such as an interferometric distance sensor, an optical roughness sensor, an optical profilometer, or an inspection camera. The contactless sensor is configured to be optically connected to the measuring apparatus or machine tool (e.g. CMM), e.g. for sensing and/or operational purpose.

The optical probe device 12 can be optically connected, contactlessly (e.g. by an air-gap interface, a combination of one or more lens and/or mirrors) or through an optical fibre 15 (as illustrated in FIG. 1), to the coupling element 30*a*, e.g. for providing an optical connection to a light source and/or a light analyser (e.g. wavelength analyser) that are remotely located (e.g. in a mobile or static portion of the measuring apparatus or machine tool, notably on the articulated probe head thereof). Alternatively or complementarily, the optical probe device can be optically connected (contactlessly or with a physical contact) to an optical-electrical converter located in the contactless sensing unit 10 so as to provide an alternative or complementary wired or wireless connection.

Alternatively, the optical probe device 12 can be optically connected to a light source and/or a light analyser located in the contactless sensing unit 10. The light source and/or the light analyser can be rigidly attached or united to the optical probe device 12. Moreover, the light source and/or the light analyser can be integrated within the housing of the optical probe device 12. Measurements data can be provided to the measuring apparatus or machine tool 1 by a wired or a wireless data communication and/or by an optical data communication, notably provided by the coupling element.

As illustrated in the FIG. 1, the coupling element 30*a* provides a mechanical connection to the complementary coupling element 30*b* on the measuring apparatus or machine tool 1, advantageously on the articulated probe head 50, for allowing a positioning and/or an orientation of the contactless sensing unit 10 notably in the measuring volume of the measuring apparatus or machine tool 1. Depending on the measuring apparatus or machine tool 1 (notably on the articulated probe head), the orientation can be provided in a continuous, indexable, automatic, assisted and/or manual mode.

As described above, the coupling element 30*a* can be complementary configured to provide an optical connection 32*a* to the complementary coupling connecter 30*b* on the measuring apparatus or machine tool, the probe device being advantageously optically connected to the coupling element 30*a* by an optical fibre 40 as illustrated in FIG. 1. Depending on the application, the optical fibre 40 and/or the optical connection 32*a* can be a single mode, a multi-mode or an all-in-one mode. Preferably, the optical fibre and/or the optical connection is a multimodal or all-in-one type for allowing a simultaneously transmission of both emitted and reflected lights.

Advantageously, the coupling element 30*a* and the complementary coupling element 30*b* are configured to allow an automatic switching of the contactless sensing unit 10 on the measuring apparatus or machine tool 1 (i.e. without requiring an intervention of the operator, while advantageously providing positioning and orientation repeatability). In particular, the coupling element 30*a* and the complementary coupling elements 30*b* can be advantageously configured to provide a self-centring and/or a self-alignment coupling, notably by means of a plurality of complementary positioning elements.

Preferably, the coupling element 30*a* and the complementary coupling element 30*b* are configured to allow a verification that the contactless sensing unit 10 is operationally coupled to the measuring apparatus or machine tool 1, notably by means of a two-part verification electrical circuit.

One part of the electrical circuit is located in the coupling element 30*a* while the other part is located in the complementary coupling element 30*b*. The two-part electrical circuit can be configured to wirely or wirelessly operate. Alternatively, a verification electrical circuit can be located in the complementary coupling element 30*b* and configured to sense the coupling element 30*a* when coupled.

Preferably, the coupling element 30*a* and the complementary coupling element 30*b* are configured to allow an identification of the contactless sensing unit when coupled together, notably by means of the two-part identification electrical circuit.

The coupling element 30*a* and the complementary coupling element 30*b* can be configured to provide a powering and/or a data connection 31*a* (notably a single- or multiple-wired powering and/or data connection) to one or more active components of the contactless sensing unit 10, such as a data storage circuit 13 and/or an electrical circuit 11 as illustrated in FIG. 1.

The electrical circuit 11 can be any one of: an identification circuit providing a digital identification of the contactless sensing unit, a verification circuit for verifying that the contactless sensing unit is operationally coupled to the measuring apparatus or machine tool, an antitampering circuit for enabling an antitampering service, a data encoding circuit for providing secure and/or error robust encoding, an operating circuit for operating the contactless sensor unit; an operational sensor circuit for sensing an operational status of the contactless sensor unit, and an environmental sensor circuit. The electrical circuit 11 can also be: a cooling/and/or heating element (e.g. a Peltier element), a cleaning device for cleaning a portion of the contactless sensing unit 10, advantageously a portion of the optical probe device 12, in particular the one or more optical objectives 18*a*, 18*b*. The electrical circuit 11 can also be the above-described optical-to-electrical converter being optically connected to the optical probe device for dimensional or surface properties measurements.

The contactless sensing unit 10 can be provided with a fluid-based cooling and/or heating element, notably for stabilizing the temperature of at least a portion of the contactless sensing unit 10 and/or of the optical probe device 12. The contactless sensing unit 10 can, alternatively or complementarily, be equipped with a fluid-based cleaning device for cleaning a portion of the contactless sensing unit 10, advantageously a portion of the optical probe device 12, in particular the one or more optical objectives 18*a*, 18*b*. The contactless sensing unit 10 can be, alternatively or complementarily, equipped with an air-bearing for allowing/enabling a movement of a mobile portion of the contactless sensing unit 10. In such embodiments, the coupling element 30*a* and the complementary coupling element 30*b* can be configured to provide a fluid connection for providing fluids (e.g. air, gas, liquids) to the contactless sensing unit 10, e.g. for enabling air-bearing, cooling, heating, actuating, and/or cleaning of a portion and/or a component (e.g. actuator) of the contactless sensor unit 10. The provided fluids can be under pression, notably for activate air-bearing, cleaning and actuating purpose.

These coupling elements and the complementary coupling elements allow to have automatically different contactless sensing units at disposal on the same measuring machine, not only contactless sensing units having different measuring ranges or features, but also other touch and contactless probes.

A measuring apparatus or machine tool 1 provided with a complementary coupling element 30*b* having the above described connections allows a selectively use of a large panel of distinct contactless sensing units 10 (as described above), notably between passive and active contactless sensing units (i.e. contactless sensing units devoid or comprising one or more electrical circuits).

According to the invention, the articulated probe head 50 can be any support that, when operationally attached to a measuring apparatus or machine tool 1, provides a mechanical maintaining of an attached contactless sensing unit 10 at a predefined position and/or at a predefined orientation around one or more rotational axes (notably in an indexable, continuous, automatic and/or manual mode) with respect to the measuring apparatus or machine tool 1, notably with respect to a mobile arm or element thereof. The articulated probe head 50 can be advantageously mounted on a mobile arm (e.g. horizontal or vertical arm) or on a mobile element of the measuring apparatus or machine tool 1.

The articulated probe head 50 can be a manual actuatable and/or motorized articulated head, i.e. provided with one or more motors for orientating the contactless sensing unit 10. The rotational axis or axes of the articulated probe head can be continuous, indexable, or a combination thereof.

In the illustrated embodiment of FIG. 1, the articulated probe head is an articulated probe head with two perpendicular axes of rotation which is fixable to a measuring apparatus or machine tool 1, notably to a mobile arm or element of a CMM (e.g. as described by U.S. patent Ser. No. 10/557,702).

The measuring machine 1 can be any measuring machine for (dimensional) metrology, notably configured to provide and/or execute a measurement of a dimension and/or a surface properties of a workpiece with resolution less than 100 μm; preferably than 10 μm. The measured dimension and/or a surface properties can be: a linear dimension (e.g. a length of a side, a distance between two points or sides of the workpiece, an outer diameter of the workpiece, a depth or an inner diameter of a cavity of the workpiece), an angle, a roughness of a surface of the workpiece, a thickness of a layer of the workpiece, a coordinate of a point on a surface of the workpiece, and/or a profile of the workpiece. This list is not exhaustive.

In particular, the measuring machine 1 can be a: (manual, semi-assisted, automatic) CMM (e.g. a bridge-CMM, an articulated CMM, a shop floor CMM), a measuring robot, an inspection machine or robot.

The machine tool 1 can be any machine for handling or machining workpiece notably being made of metal or rigid materials. The machine tool can be configured to operate in a manual, semi-assisted or automatic mode. In particular, the machine tool 1 can be a computerized numerical control machine (CNC).

The contactless sensing unit 10 in combination with the articulated probe head 50 increases measurement versatility by allowing measurement of non-flat workpieces along a plurality of orientations without requiring a re-position of the workpiece to be measured. Alternatively or complementarily, the measuring apparatus or machine tool can be provided with a rotary table for angularly positioning the workpiece to be measured, so as to increase the measurement versatility.

The contactless sensing unit 10 can be operationally attached to the measuring apparatus or machine tool 1, alone or in combination (i.e. simultaneously) with one or more other contactless sensing unit 10 and/or one or more other probing unit(s) for providing multi-probing solution. The other probing unit(s) can be contactless or touching probing unit(s) for improving measurement versatility and/or for reducing probe changing latency.

It has to be noted that today, the probe devices 12 can be manufactured and provided by third party as standalone units for integration in a contactless sensing unit, e.g. inside the housing 20 thereof. However, a limiting factor for integrating such optical probe device 12 into the contactless sensing unit 10 is given by the capability of the measuring apparatus or machine tool 1 to operationally orient and support (directly or by means of the articulated probe head 50) the weight of the entire contactless sensing unit 10, for any contactless sensing unit configuration (i.e. having different measurement range) and along any possible orientations and movements thereof.

Moreover, another limiting factor for integrating these optical probe devices into the contactless sensing unit 10 is given by the cost of the integration. In fact, due to the various shapes and sizes of the various configurations of optical probe devices, a consistent and standard probe housing cannot be easily achieved.

As illustrated in FIG. 1, the contactless sensing unit 10 thus comprises a collar 24 circumferentially clamping the optical probe device 12 around an upper portion 14*a* of the optical probe device 12. The upper portion 14*a* is distinct from the lower portion 14*b* of the optical probe device where the optical objective 18*a* is located. As briefly introduced and defined in the summary of the invention, the upper portion 14*a* is away from the lower portion 14*b* along the optical path 19 towards the light source.

The collar 24 can be any element or assembly configured to, at least partially, circumferentially clamp the optical probe device for providing a physical support. The clamping can be achieved by one or a combination of various binding methods, notably: a physical or mechanical fastening, and an adhesive binding (e.g. gluing).

The collar 24 can be designed and/or arranged to clamp the optical probe device 12 at one or more (spatially distinct/separated) clamping zones.

The collar 24 can be used with a wide range of optical probe devices as it can be easily adapted for any particular type of probe device, notably to the shapes and dimensions thereof.

Advantageously, the collar 24 is rigidly united with the coupling element 30*a*. As illustrated in FIG. 1, the collar 24 is mechanically connected to a fastening portion 22 of the contactless sensing unit 10. The fastening portion is designed or arranged for mechanically connecting (e.g. rigidly fixing and/or receiving) the collar, possibly by means of fastening elements 24*b*. In this embodiment, the fastening portion 22 is provided by the housing 20 of the contactless sensor unit 10 that is mechanically connected to (rigidly united with) the coupling element 30*a*. In particular, the coupling element 30*a* can be fixed (or be part of) the housing 20.

Advantageously, the collar 24 can be configured to be a mechanical (axially and/or radially positioning- and/or orientating-) adjustable interface between the optical probe device 12 and the fastening portion 22 of the contactless sensing unit 10.

In particular, the collar 24 can be advantageously configured to allow adjustment of the relative (axial and/or radial) positioning and/or orientation of the clamped optical probe device 12 (in particular of the focal length 41, the focal axis 42, and/or focal point 43 provided by the optical probe device 12) with respect to a (virtual or physical) reference, notably of the contactless sensing unit 10, measuring apparatus or machine tool 1, and/or of the articulated probe head 50.

Figure 2:
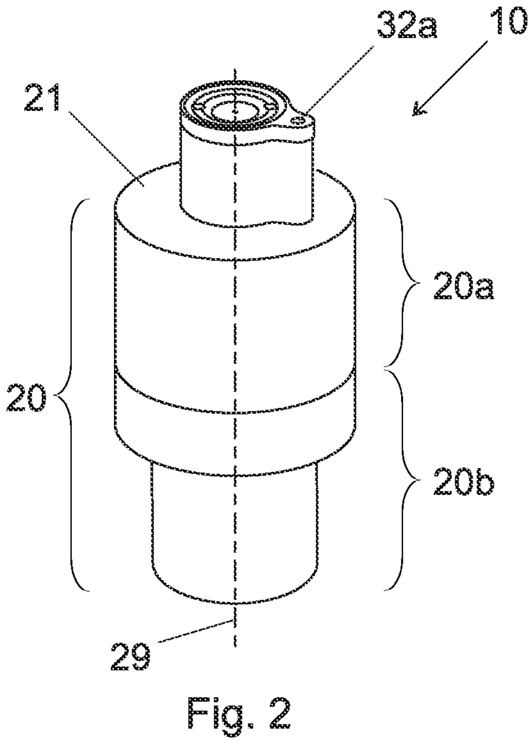
FIG. 2 illustrates a perspective view of the contactless sensor unit according to an embodiment.

The focal axis 42 of the optical probe device 12 is illustrated in FIG. 1 as being substantially coaxial to the longitudinal axis 19 of the body of the optical probe device 12 and substantially coaxial to the longitudinal axis 29 of the contactless sensing unit 10 as illustrated in FIG. 2. Nevertheless, the optical probe device 12 and/or the contactless sensing unit 10 can be configured to provide a focal axis 42 being perpendicular or inclined (e.g. by an angle in the range from 0° up to 180°, typically in a range from 0° up 90°) with respect to the longitudinal axis 29 of the contactless sensing unit 10 and/or the longitudinal axis of the body 19 of the optical probe device 12.

A precise (axial and/or radial) positioning and/or orientation (alignment) of the optical probe device 12 permits to optimise measurements as well as calibration processes on the measuring apparatus or machine tool 1 by reducing the optical operational uncertainty of the contactless sensing unit caused by the assembly/manufacturing of the contactless sensing unit. The optical operational uncertainty is mainly related to the (determination of the and/or constrain of a) particular orientation and/or radial position of the focal axis 42 and/or the positioning of the focal length 41, notably to the (determination of the and/or constrain of a given) spatial positioning of the focal point 41, with respect to the reference.

The reference can be, or corresponds to, a part of one or a combination of the followings: a portion of the contactless sensor unit (e.g. the fastening portion 22), the coupling element 30*a* of the contactless sensing unit 10, the housing 20 of the contactless sensing unit 10, the complementary coupling connecter 30*b* on the measuring apparatus or machine tool 1, and the articulated probe head on the measuring apparatus or machine tool 1. Advantageously, the reference can correspond to a given spatial reference of a coordinate system of the contactless sensing unit and/or of the measuring apparatus or machine tool. This list is not exhaustive.

For reducing this optical operational uncertainty, the collar 24 can be thus configured to provide an adjustable clamping of the optical probe device 12, i.e. a clamping allowing an adjustment of a relative axial and/or radial position and/or of an angular position of the clamped optical probe device 12 with respect to the collar 24. The collar 24 and the optical probe device 12 can thus be notably connected together by means of an adjustable mechanical connection, e.g.:

an adjustable ball or pivoting joint; and/or a translational or sliding adjustable connection; and/or a radial or transversal adjustable connection.

The adjustable connection can be provided in cooperation with fixing means of the collar (e.g. one or more: screwing elements, leadscrews, ratchet or teethed elements).

Alternatively or complementarily, the collar 24 can comprise an adjustable connection for adjustment of its (axial, radial and/or angular positions) fixation to the fastening portion 22 of the contactless sensor unit 10. The collar 24 and the fastening portion 22 can thus be mechanically connected together by means of an adjustable connection, e.g.: a ball or pivoting adjustable joint, a radial or transversal adjustable connection, and/or translational or sliding adjustable connection. The adjustable connection can comprise fixing means 24*b* of the collar 24 that could cooperate with complementary elements of the fastening portion 22 (e.g. one or more: screwing elements, leadscrews, ratchet or teethed elements).

The collar 24 can be configured to provide a relative (axial and/or radial) position and/or orientation of the optical probe device 12 with respect to the reference within a given (linear/axial) position and/or angle range, advantageously within a +/−5 mm range, +/−5° range respectively; preferably within a +/−1 mm range, +/−1° range respectively.

Advantageously, at least one optical operational parameter related to (e.g. relying on, deduced or derived from, or describing) a (axial and/or radial) positioning and/or an orientation of the optical probe device 12 (being provided or feasible by means of the collar 24) can be stored in the data storage circuit 13 of the contactless sensing unit 10, notably for maintenance and/or after-sale services.

Moreover, the data storage circuit 13 can be configured to provide a data communication for allowing the measuring apparatus or machine tool 1 to access the operational parameter, notably for supporting measurement and/or calibration processes.

The data communication can be a wireless data communication. The contactless sensing unit 10 can thus comprise a wireless communication circuit (such as, for example, a radio transponder, a radio receiver and transmitter, a RFID) being operationally connected to the data storage circuit 13. The wireless communication circuit can be powered through the coupling element 30*a* and/or by a power source of the contactless sensing unit 10. Alternatively, the wireless communication circuit can be a passive circuit, i.e. a circuit being triggered by a (radio) electromagnetic signal. e.g. a passive tag, passive RFID.

Alternatively or complementarily, the data communication can be a wired data communication, e.g. relying on the electrical communication 31*a* provided by the coupling element 30*a*.

Alternatively or complementarily, the data communication can be an optical data communication, e.g. relying on the optical communication 32*a* provided by the coupling element 30*a*. The contactless sensing unit 10 can thus comprise an optical-electrical converter operationally connected to the data storage circuit 13.

The data storage circuit 13 can be configured to encode and/or encrypt data (notably the operational parameter) for providing a reliable or secure (wired, wireless and/or optical) data communication.

The operational parameter can be or represent a single value or a range of one or more of the followings:

- an axial and/or radial position and/or an angular position of the optical probe device 12 (notably of the optical objective 18) notably related to a (the) virtual or physical reference;
- an axial and/or radial position and/or angular adjustment of the optical probe device 12 (notably of the optical objective 18) notably related to a (given) axial and/or radial reference position and/or angular reference position;
- a deviation of an axial and/or radial position and/or angular position of the optical probe device 12 (notably of the optical objective 18) from a (given) axial and/or radial reference position and/or angular reference position;
- an axial and/or radial position and/or angular position of the contactless sensor unit for measurement, notably related to the (surface of the) workpiece to be measured.

The operational parameter can rely on a measurement, on an estimation and/or on a requirement, notably of the axial and/or radial position and/or angular position of the optical probe device 12, especially once clamped and/or installed in the (housing of the) contactless sensing unit 10.

The operational parameter can be stored in the data storage circuit during the assembly of the contactless sensing unit in the factory. Alternatively or complementarily, the operational parameter can be stored during calibration or maintenance processes.

The manufacturing and/or the maintenance of the contactless sensing unit 10 can thus comprise a step of storing in the data storage circuit 13 of a positioning and/or angular parameter related to a relative positioning and/or orientation of the optical probe device, notably once a positioning and/or orientation of the optical probe device has been adjusted by means of the collar.

Alternatively or complementarily, the process of positioning and/or orientation of the optical probe device can comprise a step of gluing and/or welding the clamp 24 to the optical probe device 12 and/or the fastening portion 22 of the contactless sensing unit.

For avoiding involuntary or even voluntary modification (e.g. tampering) of the adjusted positioning and/or orientation of the optical probe device with respect to the reference, it could be desirable to impede a further repositioning and/or a re-orienting of the optical probe device 12, once a repositioning and/or a re-orienting of the optical probe device 12 has been operated by means of the collar 24.

The collar can be thus configured, alone or in cooperation with the optical probe device 12 and/or the fastening portion 22 of the contactless sensing unit, to avoid and/or impede a (physical, mechanical) repositioning and/or a re-orientation of the optical probe device, e.g. by means of ratchet, teethed elements or adhesive binding layers.

The collar can be thus configured, alone or in cooperation with the optical probe device 12 and/or the fastening portion 22 of the contactless sensing unit, to cause an (human- and/or machine-) observable effect on the collar, on the optical probe device and/or on the fastening portion 22 in response to a repositioning and/or a re-orientation of the optical probe device. The observable effect can be a (physical or mechanical, e.g. coloured) mark up to a reduction of one or more functionalities (e.g. mechanical damage or destruction) of the collar, the optical probe device and/or the contactless sensing unit.

Alternatively or complementarily, the process of positioning and/or orientation of the optical probe device can comprise a step of gluing and/or welding the clamp 24 to the optical probe device 12 and/or the fastening portion 22 of the contactless sensing unit.

The contactless sensing unit 10 can also comprises a sealing ring, preferably a O-ring 28, being mounted between a portion of the optical probe device (notably near the optical objective) and the (opening 27 of the) housing 20 in order to damp vibration, to avoid harsh shocks on the optical probe device 12 in case of crash, and/or to provide liquid proof sensing unit 10 complying with the requirements of standard such as IP54 or IP67.

FIGS. 2 to 4 illustrate details of an exemplary embodiment of the contactless sensing unit 10.

Referring to FIGS. 2 to 4, the contactless sensing unit 10 comprises a substantially cylindrical probe housing 20 (i.e. having one or more round or curved cross-sections) inside which an optical probe device 12 is clamped to the probe housing 20, as described subsequently in detail, as to ensure that the optical probe device 12 is tightly held inside the housing 20 in a given position independently of the orientation of the optical probe device 12 both in static and dynamic measuring modes.

The optical probe device 12 has a cylindrical body 14 comprising an upper portion 14*a* and a lower portion 14*b*. The upper portion 14*a* comprises a top surface with a fibre connector receiving portion 14*c* extending upwards therefrom. The optical fibre 40 is then operational connected to the optical probe device 12 by means of a fibre connector 15 cooperating with said fibre connector receiving portion 14*c*. In the exemplary embodiment of FIGS. 2 to 4, the lower portion 14*b* of the probe device cylindrical body 14 comprises an annular chamfer 16 and a flat annular portion 17 surrounding the optical objective 18.

The clamping principle relies on clamping the optical probe device 12 at its circumference by means of the collar 24, the collar 24 providing a physical connection to (a portion of) the contactless sensing unit for measurement, notably a rigidly link to the coupling element 30*a* thereof.

The collar can take a form of an essential (i.e. approximatively up to precisely) circular-, semi-circular-, arc-shaped or curved element or assembly thereof configured to circumferentially clamp a surface of the optical probe device 12 (notably an outer cylindrical surface) while providing a portion for cooperating with the fastening portion 22 of the contactless sensing unit 10. The collar 24 can be a single-piece or an assembly of a plurality of pieces.

Advantageously, the collar is arranged or shaped to clamp the optical probe device 12 at a plurality of clamping zones radially located around the optical probe device so as to provide stress relief zones as well as to avoid stick-slip-effects. The collar 24 can thus be provided with a plurality of protuberances or contact elements for contacting the (body of) optical probe device 12. Advantageously, the collar can be provided with 3 protuberances or contact elements for point-shaping (punctiform) contacting the optical probe device 12 so as to provide axial and angular adjustments of the clamped optical probe device. The protuberances or contact elements can be: spheric-shaped, cup-shaped, point-shaped, conic-shaped, U-shaped and/or V-shaped elements.

Advantageously, the collar can be configured to radially adjust the positions of the protuberances or contact elements so as to (also) provide a radial position adjustment of the clamped optical probe device, e.g. by (radially) screwing protuberances or contact elements.

Alternatively, a radial position adjustment of the clamped optical probe device can be provided by the fastening element 24*b*, e.g. by screwing elements 24*b* located in oblong or enlarged hole of the collar that allow a radial positioning of the collar with respect to the fastening portion 22 of the contactless sensing unit.

As the cylindrical probe housing 20 has to be designed to physically conform with the geometry of the collar rather than the geometry of the optical device, the circumferential clamping provides an easy standardisation of the integration of various configuration of the optical probe device 12 into the contactless sensing unit 10 while reducing, not only the cost of the integration, but also the total weight the measuring apparatus or machine tool 1 has to support in any possible static and dynamic orientation for measurements.

As illustrated in FIGS. 2 to 4, the probe housing 20 of the contactless sensing unit 10 comprises a first cylindrical housing portion 20*a* for operationally integrate the optical probe device 12 in the contactless sensing unit 10 and for housing an optical fibre 40 (FIG. 1). The first cylindrical housing portion 20*a* comprises a fastening portion in form of a seat portion 22 for (preferably rigidly) retaining the collar 24. The seat portion can take a form of an annular flat seat portion 22 against which the collar, in form of a clamping ring 24 with a force-regulating screw 25, may be fixed, for example by means of several screws. The collar can be realized as a monobloc piece (as illustrated in FIGS. 2-4) or as an assembly, e.g. as a two-part pieces being pivotally connected together for facilitating the assembly of the contactless sensing unit.

The collar 24 is configured to clamp the optical probe device 12 essentially around the upper portion 14*a* of the cylindrical body 14 so as to provide a stable positioning of the optical probe device 12 with respect to the probe housing 20 for measurement.

The collar 24 of the illustrated embodiment provides a relative axial adjustment of the position of the optical probe device 12 with respect to the fastening portion 22 of the housing 20, to the coupling element 30*a* respectively. Moreover, the same collar 24 can be configured, in cooperation with the surface of the body of the optical probe device, to form not only a translational or sliding adjustable connection, but also a pivoting joint. This can be realized by arranging the clamp so as to clamp the optical probe device at a plurality of point-shaped clamping zones around the body (e.g. by means of various pointy elements and/or protuberances in the internal surface of the collar).

As briefly introduced, the collar can be provided with a clamping force regulator (e.g. in form of an elastic collar with the force-regulating screw 25). The use of a clamping force regulator provides, not only an adjustment of the axial, radial and angular positions of the optical probe device 12 with respect to the contactless sensing unit 10, but also a fine tuning and/or regulation of the clamping force applied to the optical probe device 12 by the collar for guarantying the physical integrity of the optical probe device while avoiding vibration and/or temperature-induced slipping.

The clamping force regulator can be configured to allow a technician to manually (or semi-automatically) adapt and/or regulate the clamping force during manufacturing, maintenance, reparation and/or after sale service. Alternatively or complementarily, the clamping force regulator can be configured to allow an automatically adaptation and/or regulation of the clamping force during the integration of the optical probe device 12 into the contactless sensing unit.

The use of a collar with a clamping force regulator reduces thus the risks of slipping induced by temperature variation and/or vibration as well as of clamping over-constrains.

The first cylindrical housing portion 20*a* further comprises a top surface 21 at an opposite end of the annular flat seat portion 22. The top surface 21 comprises a recess (not shown) of a predefined contour to receive a lower portion of the coupling element 30*a* which is fixed to the top surface 21 for example by means of screws. The coupling element 30*a* is in the form of a self-centring interface with optical and electrical connectors, as described for example in US2011/0229091.

The probe housing 20 of the contactless sensing unit 10 comprises a second cylindrical housing portion 20*b* configured to cooperate with the first cylindrical housing portion 20*b*, notably to essentially house the optical probe device 12.

The probe housing 20, notably the second cylindrical housing portion 20*b*, can comprise a protection element or device for protecting the optical objective 18 against shock and/or contaminants during transportation, storage and/or measurement inactivity. The protection element or device can be a protection lens or cap, notably being (automatically or manually) moveable between a protection position and a rest position.

The second cylindrical housing portion 20*b* of the illustrated embodiment comprises a first and a second cylindrical part 29*a*, 29*b*. The diameter of the first cylindrical part 29*a* is larger than the diameter of the second cylindrical part 29*b* and is adapted to receive the clamping ring 24. A distal end portion of the second cylindrical part 29*b* comprises an inclined annular seat portion 26*a* and a flat annular seat portion 26*b* bordering an opening 27.

In the illustrated embodiment, the collar 24 is at least partially made of steel, while the housing 20 is at least partially made of aluminium, for limiting the weight of the contactless sensing unit.

Preferably, the clamp can have the same thermal expansion as the (body of the) optical probe device for reducing the risk of slipping induced by temperature variation.

The optical probe device 12 is positioned inside the second cylindrical part 29*b* such that its annular chamfer 16 rests on the inclined annular seat portion 26*a* while its flat annular portion 17 rests on the flat annular seat portion 26*b* of the second cylindrical part distal portion. A sealing ring, preferably an O-ring 28, can be mounted inside the second cylindrical part 29*b* in a dedicated zone (not shown) around the probe device cylindrical body 14 in order to damp vibration and to avoid harsh shocks on the optical probe device 12 in case of crash.

The optical fibre 40 as schematically shown in FIG. 1 is arranged such that one end is fastened to the optical probe device 12 by means of the fibre connector 15 while an opposite end is inserted into the coupling element 30*a* for providing an optical connection to the measuring apparatus or machine tool 1, via the complementary coupling element 30*b* of the scanning articulated probe head 50.

The first and second housing portions 20*a*, 20*b* comprise each complementary threaded portions 23*a*, 23*b* to securely assemble these portions.

In another non-illustrated embodiment, the first cylindrical housing of the contactless sensing unit as described above is made of two parts, a cylindrical part open at both ends and a cover securely mounted to cover one open end of the cylindrical part, for example by several screws. This configuration may ease the manufacturing process as some issues may arise during fabrication of the cylindrical housing made of one part. These issues are mainly related to the building of metal shavings during the turning process which cannot easily escape the hollow turned part.

Alternatively or complementary to the illustrated embodiment, the second cylindrical housing portion 20*b* can comprise the seat portion 22 or a complementary seat portion for receiving the collar 24, alone or in cooperation with the first cylindrical housing portion 20*a*.

Advantageously, the probe housing 20 can be configured to protect the probe device and/or the optical fibre 40 (alternatively or complementarily the one or more lens and mirrors used for connecting the optical probe device to the coupling element) against liquid and/or air contaminants (e.g. by means of the sealing ring), more advantageously against shocks.

The data storage circuit 13 of the exemplary embodiment is in form of a printed circuit and is located within the housing 20. The data storage circuit 13 is accessible to the measuring apparatus or machine tool 1 by an electrical (data) communication provided by the coupling element 30*a*.

Advantageously, the data storage circuit 13 can store not only one or more operational parameters related to (e.g. depending on) axial, radial and/or angular positions of the optical probe device (e.g. actual operational parameters) with respect to the contactless sensing unit, but also other operational parameters (e.g. calibration data, nominal operational parameters), one or more identifier(s) of the contactless sensor unit, notably of the optical probe device 12 (e.g. unique and/or device identifiers), and/or additional (manufacturing) information (e.g. histories, date of manufacturing).

Notably, the data storage circuit 13 can store one or a combination of the followings:

- an identification label (e.g. name) assigned to the optical probe devices 12; and/or to the contactless sensor unit 10; and/or
- a serial number of optical probe device 12 and/or of the contactless sensor unit 10; and/or
- a part number assigned to the optical probe devices 12 and/or to the contactless sensor unit 10 (e.g. a catalogue and/or after-sale part number); and/or
- an identification of the manufacturer of the optical probe device 12.

Advantageously, the data storage circuit 13 can (alternatively or complementarily) store one or a combination of the followings:

- a production date of the optical probe device 12 and/or of the contactless sensor unit; and/or
- a maintenance date or history of maintenance(s) of the optical probe device 12 and/or of the contactless sensor unit; and/or
- a nominal and/or actual working distance; and/or
- a nominal and/or actual measurement range; and/or
- a nominal and/or actual angular measurement range (or a nominal acceptance angle); and/or
- a nominal and/or actual measurement resolution along a measuring axis (e.g. the focal axis 42 and/or the longitudinal axis 29); and/or
- a nominal and/or actual spot diameter of the focal point 43; and/or
- a nominal and/or an actual calibration data for mapping and/or correcting measurements provided by the contactless sensing unit; and/or
- a (nominal and/or actual) geometrical and/or optical aberrations of the optical objective 18; and/or
- a weight of the contactless sensing unit.

Actual operational parameters can be, or represent, operational parameters which are related to (or dependent from) an axial, radial and/or an angular position of the optical probe device guaranteed by the collar. In particular, actual operational parameters can be determined as a function of a measure and/or of an estimation being notably executed during the assembly of the contactless sensing unit in the factory and/or during a maintenance of the contactless sensing unit, once the optical probe device is positioned (or repositioned) by means of the collar.

Preferably, the coupling element 30*a* and the complementary coupling elements 30*b* of the illustrated embodiment are also configured to provide electrically coupling 31*a*,31*b* to the contactless sensing unit 10 so as to provide electrical power to one or more electrical circuits 11 and/or the data storage circuit 13 that can be integrated in the contactless sensing unit 10. The electrical circuit 11 can be an operating circuit for operating the contactless sensor unit, a sensor for sensing an operational status of the contactless sensor unit (e.g. accelerations, working cumulated time, wear, overheating, shocks, abnormalities, malfunctioning, altering, tampering, etc.), and/or an environmental sensor (such as a sensor sensing air temperature, humidity, air quality, contaminants, pressure, dust concentration and/or noise).

The data provided by the electrical circuit 11 can be sent to the measuring apparatus or machine tool by means of an electrical and/or optical a data communication provided by the coupling element 30*a*. Alternatively or complementarily, the data provided by the electrical circuit 11 can be wirelessly provided to the measuring apparatus or machine tool and/or stored in the data storage circuit 13.

LIST OF REFERENCE

Measuring apparatus or machine tool, e.g. Coordinate measuring machine 1
Contactless sensing unit 10
Electrical circuit 11
Optical probe device 12
data storage circuit 13
Cylindrical body 14
Upper portion 14*a*
Fibre connector receiving portion 14*c*
Fibre connector 15
Lower portion 14*b*
Annular chamfer 16
Flat annular portion 17
First optical objective 18*a*
Second optical objective 18*b*
Optical path 19
Probe housing 20
first housing portion 20*a*
Top surface 21
Annular flat seat portion 22
Threaded portion 23
Collar 24
screws 24*b*
Clamping ring
Force regulating screw 25
Second housing portion 20*b*
First cylindrical part 29*a*
Second cylindrical part 29*b*
Inclined annular seat portion 26*a*
Flat annular seat portion 26*b*
Opening 27
Sealing/O-ring 28
longitudinal axis 29
Coupling element 30*a*
electrical connection 31*a*
optical connection 32*a*
Optical fibre 40
Focal length 41
Focal axis 42
Focal point 43
Scanning articulated probe head 50
Complementary coupling element 30*b*
complementary electrical connection 31*b*
complementary optical connection 32*b*

The invention claimed is:

1. A contactless sensing unit for a coordinate measuring machine or machine tool, the contactless sensing unit comprising an optical probe device, a coupling element for mechanical connection to a complementary coupling element of the coordinate measuring machine or machine tool, and a housing retaining the optical probe device, the housing being mechanically connected to the coupling element, wherein the optical probe device comprises a cylindrical body and an optical objective at a distal end of a lower portion of said probe device for sensing a surface of a workpiece, and wherein the contactless sensing unit further comprises an elastic C-shaped ring of steel or of an alloy clamping circumferentially the cylindrical body of the optical probe device, the elastic ring being fastened to a fastening portion of the housing allowing a radial position adjustment of the clamped optical probe device and the elastic ring has a force regulating screw across a gap of the elastic C-shaped ring for adjusting a clamping force of the elastic C-shaped ring on the cylindrical body.

2. The contactless sensor unit of claim 1, wherein the coupling element provides an optical connection or an optical fiber to the complementary coupling element of the measuring apparatus or machine tool to optically connect the optical probe device to said complementary coupling element.

3. The contactless sensing unit of claim 2, the housing having:

a first housing portion housing an optical fiber for optically connecting the optical probe device to the optical connection of the coupling element, and a second housing portion housing the optical probe device.

4. The contactless sensing unit of claim 1, further comprising a data storage circuit for storing an operational parameter related to an axial, a radial and/or an angular position of the optical probe device with respect to the fastening portion.

5. The contactless sensor unit of claim 4, wherein said coupling element is configured to provide power and/or data transmission to the data storage circuit.

6. The contactless sensor unit of claim 1, wherein the optical probe device comprises one or more of the followings: a chromatic distance sensor, an interferometric distance sensor, an optical roughness sensor, an optical profilometer, and an inspection camera.

7. A measuring apparatus or machine tool, comprising a complementary coupling element and the contactless sensor unit of claim 1, wherein the coupling element of the contactless sensor unit is connected to the complementary coupling element of the measuring apparatus or machine tool.

8. The measuring apparatus or machine tool of claim 7, further comprising an articulated probe head for orienting and/or positioning the contactless sensor unit.

9. The measuring apparatus or machine tool of claim 8, the articulated probe head being a motorized or manually operated articulating probe head configured to orient the contactless sensor unit along one, two or more perpendicular rotational axis.

10. The measuring apparatus or machine tool of claim 7, further comprising a light source and a light analyzer for operating the contactless sensor unit, the light source and the light analyzer being mounted on a static or mobile portion of the measuring apparatus or machine tool or in the contactless sensor unit.

11. Method for measuring a dimension or surface properties of a workpiece by means of a contactless sensing unit, the contactless sensing unit comprising: an optical probe device having an optical objective for sensing a workpiece and a cylindrical body, a coupling element for mechanical connection to a complementary coupling element of a measuring apparatus or machine tool, and a housing mechanically connected to the coupling element and configured to house the optical probe device; the method comprising:

adjusting a relative axial, radial and/or angular position of the optical probe device with respect to a fastening portion of the housing by clamping circumferentially the cylindrical body of the optical probe device with an elastic C-shaped ring of steel or of an alloy and fastening the elastic C-shaped ring in an adjusted position on a fastening portion of the housing, adjusting a clamping force on the cylindrical body with a force regulating screw across a gap of the elastic C-shaped ring.

12. The method of claim 11, further comprising steps of:

determining an operational parameter related to said given axial, radial and/or angular position of the optical probe device; and storing the operational parameter in a data storage circuit of the contactless sensing unit.

13. The method of claim 11, further comprising steps of:

automatically attaching the contactless sensing unit to the measuring apparatus or machine tool by means of the complementary coupling element thereof;

in the measuring apparatus or machine tool, reading the operational parameter stored in the data storage circuit of the contactless sensing unit; and in the measuring apparatus or machine tool, using said operational parameter for providing measurement of the dimension or surface properties of the workpiece.

14. The contactless sensing unit of claim 3, the second housing portion comprising an opening surrounding the optical objective of the optical probe device and a ring arranged to be in contact with a surface of the optical objective and/or of the optical probe device, the ring being configured for vibration reduction and/or for shock absorption and/or for avoiding intrusion of water and/or dust in an internal volume of the contactless sensing unit.

15. The measuring apparatus or machine tool of claim 7, comprising a rotary table for positioning a workpiece to be measured.

* * * * *